US006944819B2

(12) United States Patent
Banatwala et al.

(10) Patent No.: US 6,944,819 B2
(45) Date of Patent: Sep. 13, 2005

(54) COMPUTER METHOD AND APPARATUS FOR PREVIEWING FILES OUTSIDE OF AN APPLICATION PROGRAM

(75) Inventors: Mustansir Banatwala, Hudson, NH (US); Jorge Camargo, Westford, MA (US)

(73) Assignee: Eastman-Kodak Company, Rochester, NY (US)

( * ) Notice: Subject to any disclaimer, the term of this patent is extended or adjusted under 35 U.S.C. 154(b) by 1280 days.

(21) Appl. No.: 08/781,696

(22) Filed: Jan. 10, 1997

(65) Prior Publication Data

US 2004/0205625 A1 Oct. 14, 2004

(51) Int. Cl.$^7$ .............................................. G06F 7/00
(52) U.S. Cl. ...................................... 715/526; 345/581
(58) Field of Search ................................. 707/101, 200, 707/516, 526; 348/400; 395/101; 345/118, 581; 382/166; 715/516, 526

(56) References Cited

U.S. PATENT DOCUMENTS

| | | | | |
|---|---|---|---|---|
| 4,999,790 A | * | 3/1991 | Murayama et al. | 707/3 |
| 5,345,550 A | * | 9/1994 | Bloomfield | 345/353 |
| 5,581,703 A | * | 12/1996 | Baugher et al. | 709/225 |
| 5,752,244 A | * | 5/1998 | Rose et al. | 707/5 |
| 5,799,307 A | * | 8/1998 | Buitron | 707/100 |
| 5,831,631 A | * | 11/1998 | Light et al. | 345/440 |
| 5,933,599 A | * | 8/1999 | Nolan | 345/329 |
| 6,008,806 A | * | 12/1999 | Nakajima et al. | 345/335 |
| 6,038,610 A | * | 3/2000 | Belfiore et al. | 709/300 |
| 6,061,695 A | * | 5/2000 | Slivka et al. | 707/513 |
| 6,243,724 B1 | * | 6/2001 | Mander et al. | 707/526 |

OTHER PUBLICATIONS

Photoimpact 3.0 File Dialog Screendumps, Ulead Systems, Inc, 1996, Fig. 1–3.*

Microsoft Windows 95 Quick view Screendumps, 1995, Fig. 1–3.*

Microsoft NT Explorer 4.0, screen dumps, Fig. 8–9, 1994.*

Gavron et al, How to Use Microsoft Windows NT 4 Workstation, pp. 33–39, 1996.*

Microsoft Windows NT 4.0 screen dumps (Figs. 1–7), 1996.*

"Wang, Microsoft Announce Imaging Software for Microsoft Windows 95; Provides Built–in Support for Document Imaging Applications," Press Release, Jan. 16, 1996.

* cited by examiner

*Primary Examiner*—Cesar B Paula
(74) *Attorney, Agent, or Firm*—Hamilton, Brook, Smith & Reynolds, P.C.

(57) ABSTRACT

A method and apparatus for previewing images and image file information without opening and running an application in working memory. The previewing of a user-selected file includes a summary of file characteristics and contents including images. The summary synopsizes file information and characteristics such as height, width, length, color type, resolution, compression type used for storing and forming the file, annotation graphics of the file and the like. The preview also provides display of the file images, preferably in a reduced size manner for ease of user previewing. The file preview apparatus and method of the present invention include operating system means coupled to a display assembly for generating display of indications of file characteristics of the user-selected files. The operating system means obtains and enables display of file characteristics indicia, external to and outside of an application program opened and running in the working memory. The display assembly is responsive to the operating system means and provides display of the file characteristics indicia in a manner free of opening an application program in the working memory.

17 Claims, 4 Drawing Sheets

COMPUTER METHOD AND APPARATUS FOR PREVIEWING FILES OUTSIDE OF AN APPLICATION PROGRAM

BACKGROUND OF THE INVENTION

Document imaging is a technology that converts paper documents/information into electronic form where storage retrieval can be automated using standard computer technology. By capturing paper documents as electronic images stored by the computer, all the benefits and power of database, e-mail, networks, facsimile and memory storage technologies can be applied to what was once manually processed information.

Although image documents can be electronically filed using multiple index and filing methods and then quickly searched and retrieved and subsequently shared among multiple users, each task must be controlled and managed through a common application program. Typically, to open an application program involves loading object oriented programming controls (e.g., Microsoft Object Linking and Embedding "OLE" controls) and loading the operating system.

Briefly, OLE controls (called OCX's or ActiveX) are a type of OLE component standard. OCX's include properties, methods and events which enable programmers to add specific (well defined) functions to application programs. The functions enable end users to perform certain tasks on desired data. The self-contained objects (OCX's) are portable and insertable into any container or applications program. A "container application" or an OLE "control container" (and generally, "object container") is any working computer program that is formed or has defined within it OLE components and objects.

Thus the loading, opening and running of an application program takes time and working memory.

In another example of image document search and retrieval, images and respective image information are stored on a database. The database supports a dedicated application program which searches and retrieves images in response to user command. Again the disadvantage of the dedicated application program is the time and working memory required to load the program before running it.

SUMMARY OF THE INVENTION

The present invention overcomes problems of the prior art. In particular the present invention provides a method and apparatus for previewing files, images and image file information without opening and running an application program in working memory. As used herein, "previewing" with respect to a file includes an overview of or summary of file characteristics and contents including images. The summary synopsizes file information and characteristics such as height, width, resolution, compression type used for storing and forming the file, annotation graphics of the file, and the like. The preview provides display of the file images, preferably in a reduced size manner for ease of user previewing.

In accordance with the present invention, a computer system has (i) a working memory in which application programs are executed and (ii) an operating system. Execution of application programs in the working memory generates files of the computer system. File preview apparatus and method of the present invention include operating system means coupled to a display assembly for generating display of indications of file characteristics of those files selected by a user. The operating system means obtains and enables display of file characteristics indicia, outside of an application program opened and running in the working memory. The display assembly is responsive to the operating system means and provides display of the file characteristics indicia in a manner free of opening an application program in the working memory.

In one embodiment, the operating system means is a file manager of the operating system. The file manager manages files generated by application programs executed in the working memory of the computer system. The file manager also enables user selection of a desired file and display of indicia of file characteristics of the desired file, without opening and running an application program in working memory.

In another embodiment, the present invention is employed as an extension of an existing file manager. The preexisting file manager is an original part of the operating system and manages files of the computer system. The present invention extension of the file manager provides user selection of desired files and generates indicia of the user selected file, for display through the display assembly, in a manner free of opening an application program in working memory.

In another embodiment, the operating system means is a document manager of the operating system. The document manager manages groups of files (e.g., folders) and enables display of indications of file grouping characteristics in response to user command. The document manager enables such display through the display assembly, without opening an application in working memory. Similar to the preexisting file manager embodiment, the document manager may be a preexisting part of the operating system, and the present invention implementation is an extension thereof to provide preview ability of file groups.

In either case of the present invention extending a preexisting file manager or document manager, the extension shares a user interface in common with the file manager/document manager. This provides a seamless and effectively full integration of the extension with the operating system.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
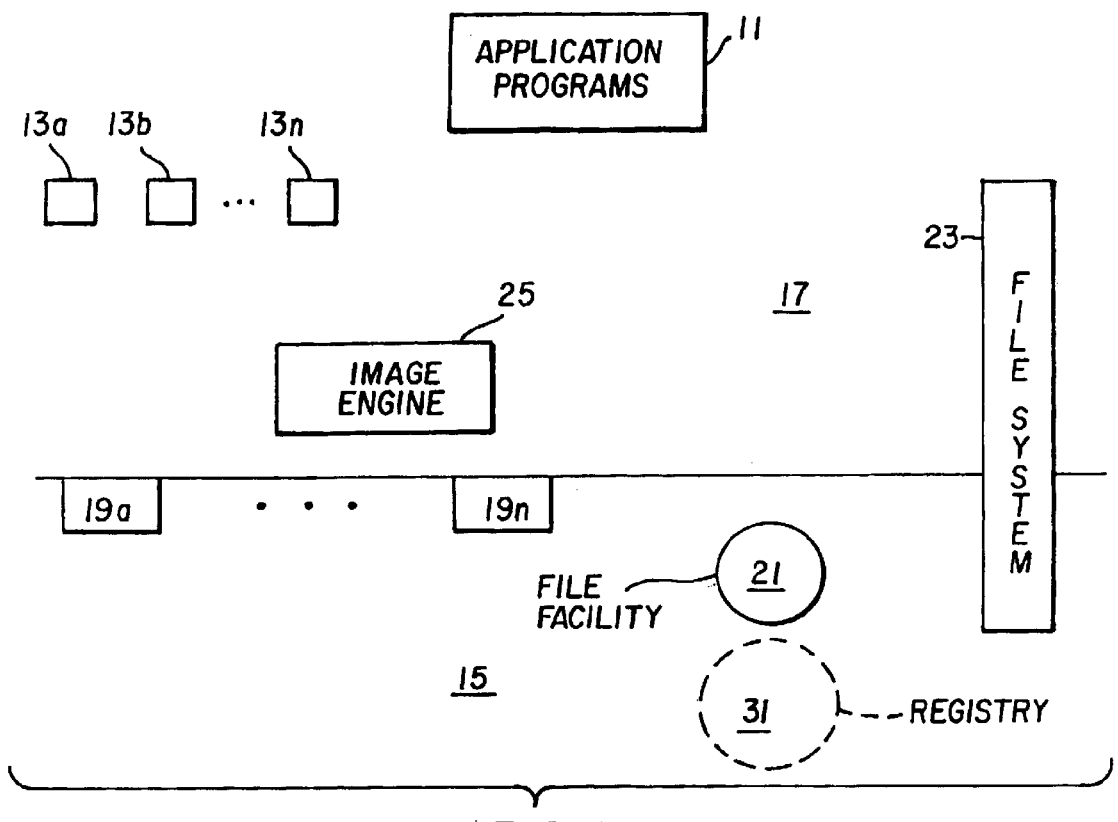
FIG. 1 is a block diagram of a computer apparatus employing the present invention.

Generally speaking, a computer system is formed of a digital processor (including a central processing unit, or "CPU") and various input/output assemblies (e.g., keyboard, mouse, display monitor, printer, and the like). Illustrated in FIG. 1 is a digital processor and more specifically the CPU and its major operating parts. Included are an operating system 15 (shown below the solid horizontal line) and a working memory/random access memory 17 (shown above the solid horizontal line). Within the operating system 15 are a plurality of application program and interface shells 19a . . . 19n and various working facilities. With respect to working facilities, a file facility 21 (such as Explorer in Microsoft Windows) is typically an inherent part of the operating system 15. Each facility enables a shell extension thereof following programming code and protocol disclosed by Microsoft or the operating system manufacturer.

For example, programmers-users follow the predefined coding and protocol of the file facility 21 to define a desired shell extension thereof. The purpose of the shell extension is defined by the programmer-user to accomplish a desired task through or in conjunction with operation of the file facility 21. One such shell extension for implementing the present invention is further described below.

In the working memory 17 half of FIG. 1, there are application programs 11 and object oriented programming controls 13a . . . 13n. The application programs 11 are executed in working memory 17 and generate various files. These files are maintained in a file system 23 which bridges across the working memory 17 and operating system 15. File system 23 follows store, exchange and retrieve protocols of a database or other accessing protocol common in the art. To that end, file system 23 may be a database or other working exchangeable and retrievable storage.

In the preferred embodiment of the present invention, an image engine 25 is also supported in working memory 17. The image engine 25 provides generation, maintenance and display of images. In particular, image engine 25 employs subroutines enabling compression, expansion, manipulation, and display of images. These images are stored in file system 23. An example of image engine 25 is the Wang Imaging for windows software. Other image systems are suitable.

Figure 2:
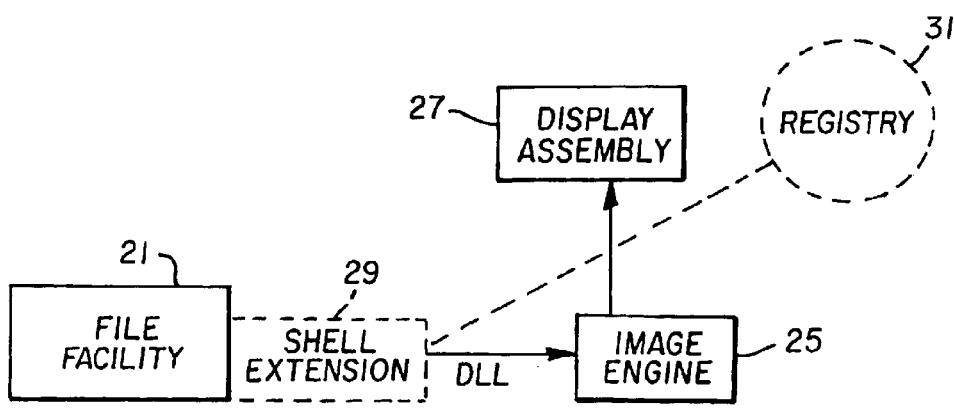
FIG. 2 is a block diagram of a preferred embodiment of the present invention.

The present invention employs the existing image engine 25 and file facility 21 to provide user preview of files from file system 23 in a manner that does not require the opening and running of an application in working memory 17. FIG. 2 illustrates the working details of the present invention. In particular, the present invention is implemented as a shell extension to the file facility 21. In a preferred embodiment, the extension 29 is called the Image shell of the Explorer facility of Microsoft Windows. The Image shell extension 29 includes a call to a dynamic library link (DLL). The key values for calling the DLL are stored in the registry 31 of the operating system 15. In response to a user command (such as click of the right mouse button), the Image shell extension 29 is invoked. In turn, the image shell DLL utilizes the image engine 25 to invoke an appropriate processing task. In particular, the image engine 25 allows the DLL to obtain from the file system 23 the user desired file. The image engine 25 also understands the file format of the requested file and subsequently enables display of file information and file contents through a display assembly 27. In particular the image engine 25 provides information regarding file characteristics and file contents including images. The display assembly 27 displays that information in text or images.

In one embodiment, the display assembly 27 displays a text indication of file characteristics including but not limited to file height, width, length, color type, resolution, compression type used for forming the file, annotation graphics, and the like. With respect to image contents of the desired file, the display assembly 27 employs a resizing routine so that the image is displayed in various sized windows being viewed by the end user. The resizing routine is of the "fit the window" type known in the art. Generally the resizing routine calculates the ratio of the subject image to the area of the viewing window. The ratio is then used in deleting various pixels from the subject image as stored to form a new "zoomed" working image. The display assembly 27 then supports display of the resulting working image in the targeted viewing area or window viewed by the end user.

Other zooming routines or image sizing routines are suitable, whether they reduce, enhance or enlarge the subject original image. In the preferred embodiment, a reduced in size or minified resulting image is generated by the display assembly 27 for ease of user viewing. It is understood that other sizes of the subject image for viewing purposes are within the purview of one skilled in the art.

Figure 3A:
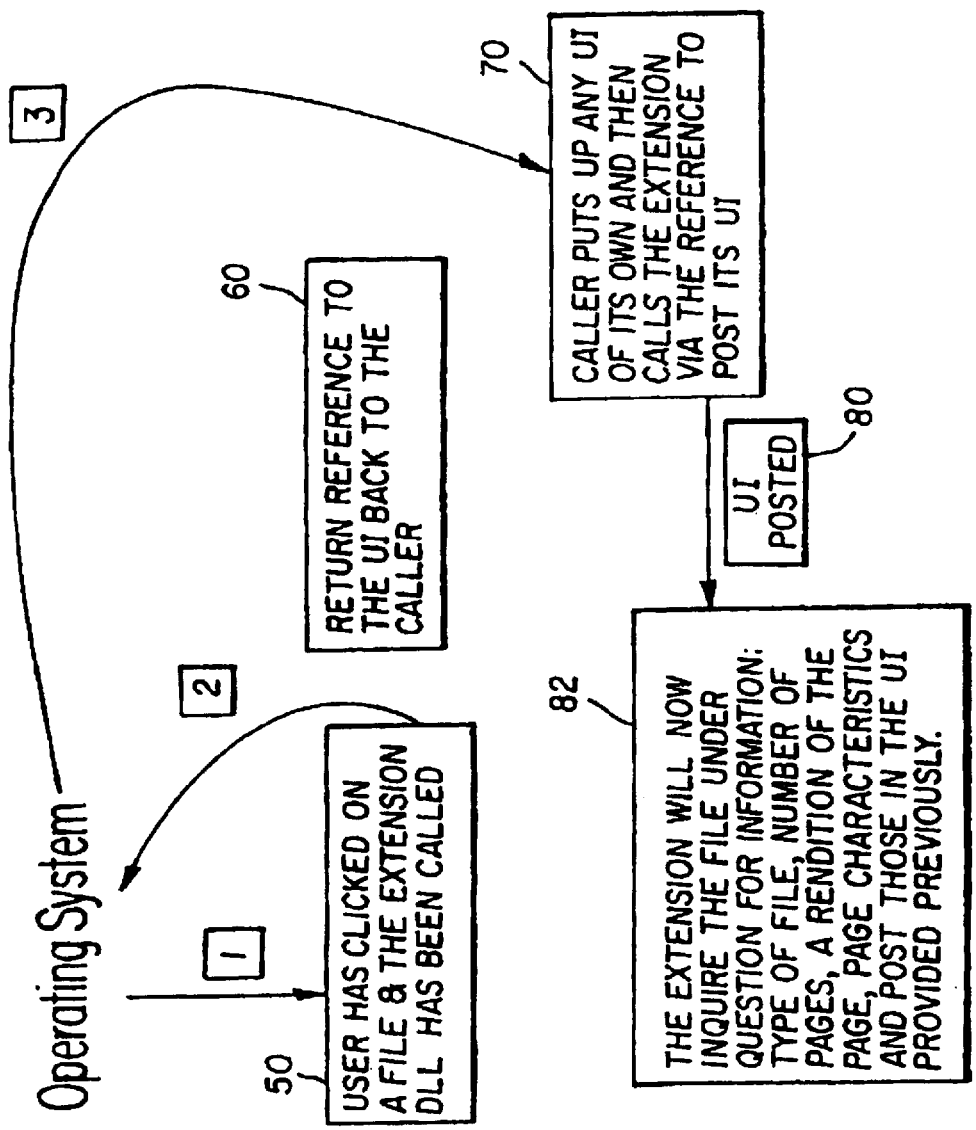
FIGS. 3A–3C are flow diagrams of the embodiment of FIG. 2.
Figure 3B:
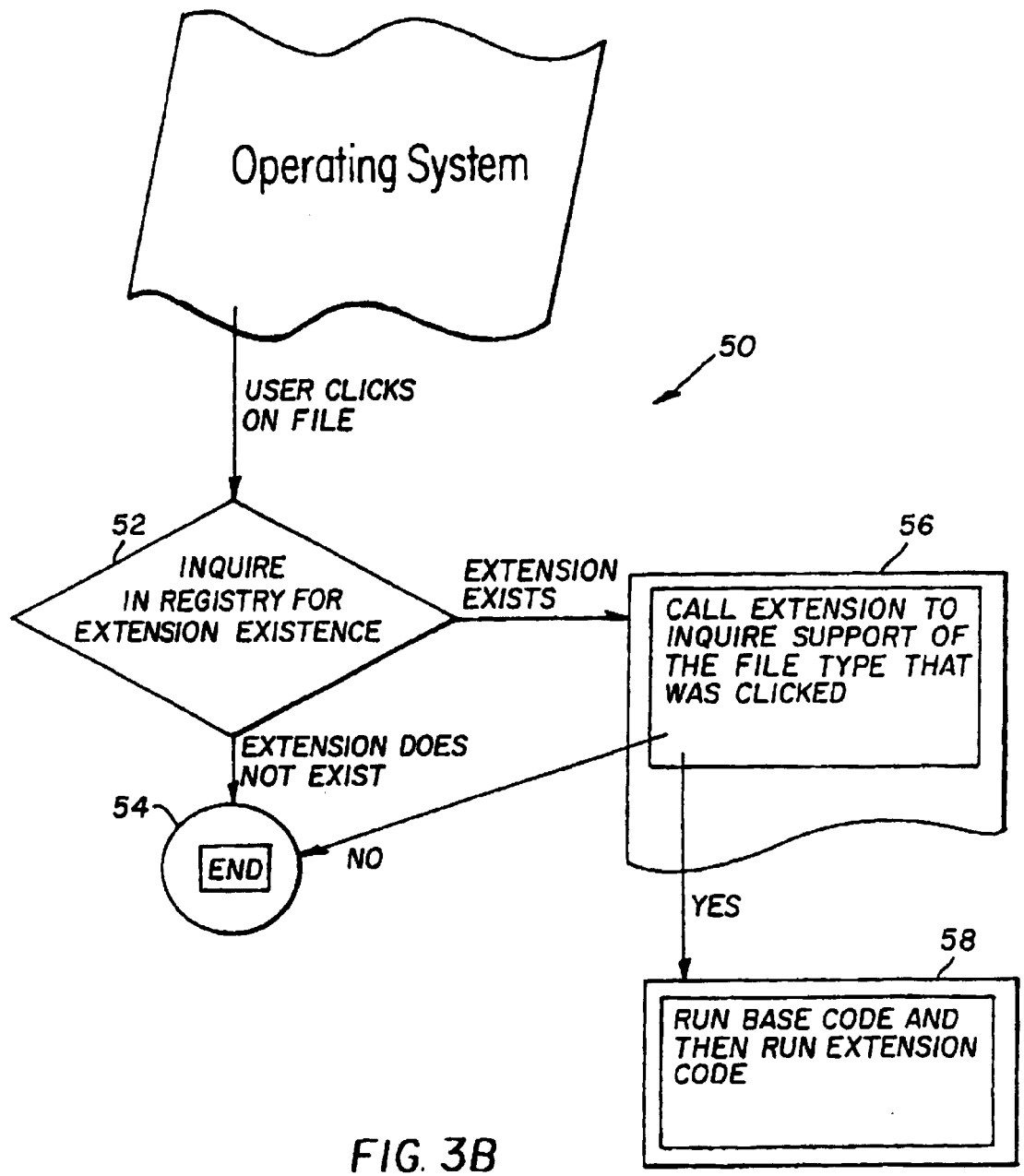
Figure 3C:
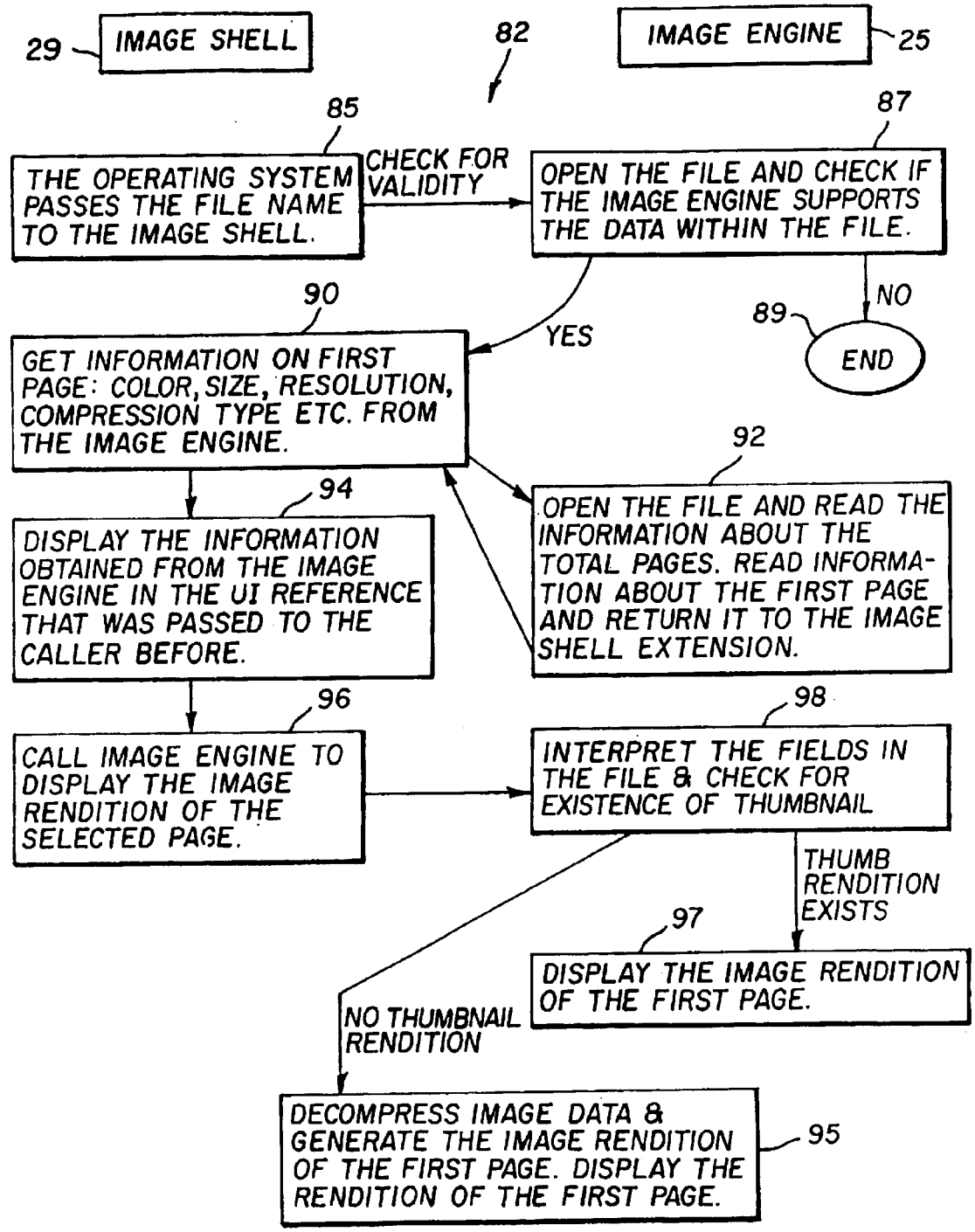

FIGS. 3A–3C more specifically detail the image shell extension 29. It is understood that similar functionality may be implemented in a stand-alone module in lieu of the extension 29. In that sense an operating system means provides the dynamic library link to call the image engine in response to user command for previewing a desired file from file system 23. Various configurations in hardware or software or combination thereof, or as a stand-alone module or extension of an existing file facility or other facility of the operating system 15 are within the purview of one skilled in the art.

At any rate, in the preferred embodiment of FIG. 2, the flow of control and operation of image shell extension 29 is illustrated in FIGS. 3a–3c. By way of overview, FIG. 3a shows the major steps involved at the operating system level. FIGS. 3b and 3c describe in particular part the first and last steps of FIG. 3a.

Upon a user's initial command or action (such as selecting a working file name by clicking the right mouse button) during running of the file facility 21, the operating system 15 calls the image shell extension DLL (step 50, FIG. 3a). This is accomplished by the operating system 15 inquiring the registry 31 for existence of the extension at step 52, FIG. 3b. If the extension is not listed in the registry 31, then the shell extension routine ends (step 54, FIG. 3b). Otherwise, where the shell extension is found to exist in the registry 31 (step 56, FIG. 3b), the operating system 15 calls the image shell extension 29 and inquires the extension for support of the file type of the working file selected by the user. If the shell extension 29 does not support the subject file type, then the shell extension routine ends (step 54, FIG. 3b). Otherwise, in the case where the shell extension 29 supports the subject file type, the operating system runs a base code and then runs the extension code (step 58, FIG. 3b).

Returning to step 60 of FIG. 3a, the foregoing includes the shell extension routine of FIG. 3b returning to the file facility 21 (which is the initial caller of the shell extension) a reference to the user interface. In turn the file facility 21 responds by putting up a user interface of its own. Next the file facility 21 uses the passed user interface reference of the extension to call the shell extension 29 to post the extension user interface (step 70, FIG. 3a). The shell extension 29 initializes and posts its user interface 80. Thereafter the shell extension posts in its user interface pertinent file information of the subject file (step 82, FIG. 3a) as supported by image engine 25 described in FIG. 3C and discussed next.

From the initial user command/action, the operating system 15 passes the file name of the subject working file to the shell extension 29 (step 85, FIG. 3C). In turn, the shell extension 29 checks the validity of the subject working file by opening the file through the image engine 25 (step 87, FIG. 3C). If the image engine 25 does not support the data (data type) within the file, then the processing between shell extension 29 and image engine 25 ends at step 89 in FIG. 3C. If the image engine 25 supports the file data, then shell extension 29 obtains from image engine 25 information regarding the first page of the subject file (step 90, FIG. 3C). To accomplish this, the image engine 25 opens the subject working file and reads file information regarding each page. After reading the first page information, the image engine 25 returns that set of information to the shell extension 29 at step 92, FIG. 3b. In response to the information obtained from the image engine 25, shell extension 29 uses the user interface reference previously passed to file facility 21 and displays the information in the previously initialized user interface of the extension (step 94, FIG. 3C).

Upon user command/action to display an image of the subject working file, image shell extension 29 calls image engine 25 at step 96 of FIG. 3b. Image engine 25 responds by interpreting various fields of the subject file and determines whether a minified version of the requested image was prestored (step 98, FIG. 3b). If the image engine 25 finds a prestored, reduced-in-size (or so called "thumbnail") rendition of the image, then image engine 25 produces a display of the minified image through the shell extension user interface (step 97). If the image engine 25 does not find a predefined thumbnail of the requested image, then image engine 25 decompresses the file image data (knowing the compression type interpreted from a pertinent field of the subject working file) and generates a reduced-in-size rendition of the image using "fit the window" techniques mentioned above (step 95). In either case of the image engine finding a prestored thumbnail rendition of the image or generating one "on the fly", the shell extension user interface displays the desired minified image to the end user.

The image shell 29 and image engine 25 continue to display file information and images upon user request/command following the steps 94, 96, 98, 95 and 97 shown in FIG. 3C and described above.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, the shell extension of the present invention may extend from various file facilities including a file manager or folder manager or the like. Although the foregoing preferred embodiment is described with respect to a file manager type facility, it is understood that similar extensions may be provided from other operating system facilities, in the manner described above, to provide file previewing outside of opening and running an application program in working memory.

Although the preferred embodiment is described with respect to a Microsoft operating system, the present invention may be employed in various operating systems.

What is claimed is:

1. In a computer system having (i) a working memory in which application programs are executed, and (ii) an operating system including a file manager for managing files of application programs executed in the working memory, internal file characteristics and file image preview apparatus comprising:

an extension coupled to the operating system in a manner such that the extension is entirely integrated with the operating system, the extension enabling user selection of a desired file and in response to user selection of the desired file, the extension enabling display of a recitation of indicia of internal file characteristics separate from the file image and the file image of the desired file by opening the desired file in a manner free of opening an application program in working memory and hence external to application programs in the working memory, and in a manner free of decoding the indicia of internal file characteristics from a filename of the desired file; and a display assembly responsive to the extension for displaying the recitation of indicia of internal file characteristics separate from the file image and the file image of the user-selected desired file by opening the desired file in a manner free of opening an application program in working memory, and in a manner free of decoding the indicia of internal file characteristics from a filename of the desired file, such that a preview of the user-selected desired file is provided.

2. Apparatus as claimed in claim 1 wherein the extension is coupled to the file manager of the operating system, such that the extension utilizes a user interface in common with the file manager to effectively provide full integration of the extension with the operating system.

3. Apparatus as claimed in claim 1 wherein the extension in response to user selection of a desired file further enables display of a working image from the file.

4. Apparatus as claimed in claim 3 wherein the display of the working image is a reduced-in-size version of the working image.

5. Apparatus as claimed in claim 1 wherein the indicia of internal file characteristics include indications of at least one of height, width, length, color type, resolution, compression type used for storing and forming the file, and annotation graphics of the file.

6. Apparatus as claimed in claim 1 wherein the file manager is a document manager for managing folders of files, and the extension enables display of an indicia of folder characteristics of a user-desired folder.

7. In a computer system having (i) an operating system and (ii) a working memory for executing application programs, internal file characteristics and file image previewing apparatus comprising:

a file manager coupled to the operating system, the file manager (a) managing files generated by application programs executed in the working memory and (b) enabling display of indicia of internal file characteristics and file image of a user-selected file by opening the desired file, said file manager being coupled to the operating system in a manner such that said display of indicia of internal file characteristics separate from the file image and the file image is generated outside of an application program opened and running in the working memory and hence external to application programs in the working memory, and in a manner free of decoding the indicia of internal file characteristics from a filename of the desired file; and a display assembly responsive to the file manager for displaying indicia of internal file characteristics and the file image of the user-selected file by opening the desired file, outside of an application program opened and running in working memory, and in a manner free of decoding the indicia of internal file characteristics from a filename of the desired file, said display assembly thus providing a preview of the user-selected file.

8. A system as claimed in claim 7 wherein the file manager in response to user selection of a desired file further enables display of a working image from the file.

9. A system as claimed in claim 8 wherein the display of the working image is a reduced-in-size version of the working image.

10. Apparatus as claimed in claim 7 wherein the indicia of internal file characteristics include indications of at least one of height, width, length, color type, resolution, compression type used for storing and forming the file, and annotation graphics of the file.

11. Apparatus as claimed in claim 7 wherein the file manager includes a document manager for managing folders of files generated by application programs executed in the working memory, and enables display of indicia of folder characteristics of respective user-selected folders in a manner free of opening and running an application program in working memory, to provide respective preview of the user-selected folder.

12. In a computer system, a method of displaying internal file characteristics and file images of a user-selected file, to provide a preview of the file, comprising the steps of:

providing a working memory for executing application programs;

executing application programs in said working memory in response to user command, said execution of the application program generating files of the computer system;

providing operating system means for enabling display of indicia of internal file characteristics separate from the file image and the file images of a file selected by a user by opening the file, the operating system means enabling display of the internal file characteristics and the file images outside of an application program opened and running in the working memory; and in a manner free of opening and running an application program in the working memory, and in a manner free of decoding the indicia of internal file characteristics from a filename of the desired file, displaying the indicia of internal file characteristics separate from the file image and the file images of a user-selected file, in response to user command for previewing that file.

13. A method as claimed in claim 12 further comprising the steps of:

through the operating system means, enabling display of a working image from the user selected file; and displaying a working image with the indicia of internal file characteristics of said file.

14. A method as claimed in claim 13 wherein the steps of enabling display of a working image and displaying the working image include reducing size of the working image to provide a minified rendition of the working image for previewing purposes.

15. A method as claimed in claim 12 wherein the step of providing indications of file characteristics includes displaying indications of at least one of height, width, length, color type, resolution, compression type used for storing and forming the file, and annotation graphics of the file.

16. A method as claimed in claim 12 wherein said step of displaying indicia of internal file characteristics separate from the file image and the file images includes providing a display assembly responsive to the operating system means for displaying indicia of internal file characteristics separate from the file image and the file images outside of an application program opened and running in working memory.

17. A method as claimed in claim 12 wherein the step of providing operating system means includes at least one of:

providing a document manager in an operating system, the document manager for managing groupings of files, the document manager enabling display of indicia of respective characteristics of user-selected groupings of the files, in a manner free of opening an application program in the working memory; and providing a file manager in an operating system, the file manager for managing files generated from application programs executed in the working memory, the file manager enabling display of indicia of internal file characteristics of user-selected files, in a manner free of opening an application program in the working memory.

* * * * *

UNITED STATES PATENT AND TRADEMARK OFFICE
CERTIFICATE OF CORRECTION

| | | |
|---|---|---|
| PATENT NO. | : 6,944,819 B2 | Page 1 of 1 |
| APPLICATION NO. | : 08/781696 | |
| DATED | : September 13, 2005 | |
| INVENTOR(S) | : Mustansir Banatwala and Jorge Camargo | |

It is certified that error appears in the above-identified patent and that said Letters Patent is hereby corrected as shown below:

Column 5
Claim 1, line 65, after "system," insert -- the extension sharing a user interface with the operating system,--

Column 6
Claim 7, line 40, after "system," insert --including sharing a user interface with the operating system,--

Column 7
Claim 12, line 24, after "means" insert --sharing a user interface with other operating system means and--.

Signed and Sealed this

Sixth Day of March, 2007

JON W. DUDAS
*Director of the United States Patent and Trademark Office*